(12) United States Patent
Chiesa

(10) Patent No.: US 8,340,841 B2
(45) Date of Patent: Dec. 25, 2012

(54) METHOD OF ESTIMATING AN ANGLE OF ATTACK AND AN ANGLE OF SIDESLIP OF AN AIRCRAFT

(75) Inventor: Alberto Chiesa, Sommariva del Bosco (IT)

(73) Assignee: Alenia Aeronautica S.p.A., Pomigliano d'Arco, Napoli (IT)

( * ) Notice: Subject to any disclaimer, the term of this patent is extended or adjusted under 35 U.S.C. 154(b) by 605 days.

(21) Appl. No.: 12/636,545

(22) Filed: Dec. 11, 2009

(65) Prior Publication Data
US 2010/0185345 A1 Jul. 22, 2010

(30) Foreign Application Priority Data
Dec. 11, 2008 (IT) ............... TO2008A0923

(51) Int. Cl.
*G05D 1/08* (2006.01)
*G06F 17/16* (2006.01)
(52) U.S. Cl. ............................................. 701/6; 701/4
(58) Field of Classification Search ............ 701/4, 6; 73/180; 244/181; 700/29, 30, 31
See application file for complete search history.

(56) References Cited

U.S. PATENT DOCUMENTS
3,654,443 A * 4/1972 Dendy et al. ............... 701/3
4,046,341 A * 9/1977 Quinlivan .................. 244/181
(Continued)

FOREIGN PATENT DOCUMENTS
EP 1 480 043 A 11/2004

OTHER PUBLICATIONS
European Search Report for corresponding international application No. 09178636.8-1236, dated Jan. 25, 2010.

*Primary Examiner* — Darnell Jayne
*Assistant Examiner* — Sasha T Varghese
(74) *Attorney, Agent, or Firm* — Merchant & Gould P.C.

(57) ABSTRACT

A method for estimating an angle of attack and an angle of sideslip of an aircraft having a plurality of control surfaces each adjustable with respect to an associated reference surface. The method includes measuring quantities representative of the angle formed by each control surface with respect to the associated reference surface, and measuring an effective rolling speed, an effective pitching speed, and an effective yawing speed of the aircraft. A linearized model of a state observer is defined according to the following equations:

$$\begin{cases} \dot{x} = Ax + Bu + L\delta y \\ y = Cx + Du \end{cases}$$

wherein u is a vector containing the values of the quantities of each control surface, x is a vector including an estimated angle of attack, an estimated angle of sideslip, an estimated rolling speed, an estimated pitching speed and an estimated yawing speed, δy is an error vector including the errors between the measured speeds and the respective estimated speeds, y is a measure vector including the values of the measured speeds, A,B,C,D are matrices representative of the behavior of the aircraft in unperturbed motion and L is a feedback matrix including the gains of a predetermined numeric control filter. The estimated angle of attack and the estimated angle of sideslip are obtained from the model to use as an actual angle of attack and an actual angle of sideslip of the aircraft.

6 Claims, 3 Drawing Sheets

U.S. PATENT DOCUMENTS

| | | | |
|---|---|---|---|
| 4,769,759 A * | 9/1988 | McGough | 701/6 |
| 6,253,166 B1 * | 6/2001 | Whitmore et al. | 703/2 |
| 6,273,370 B1 | 8/2001 | Colgren | |
| 6,330,483 B1 * | 12/2001 | Dailey | 700/28 |
| 6,466,888 B1 * | 10/2002 | McCool et al. | 702/144 |
| 6,561,020 B2 * | 5/2003 | Glenney | 73/170.02 |
| 6,772,976 B1 * | 8/2004 | Rouse et al. | 244/1 R |
| 2003/0130768 A1 | 7/2003 | Eglin | |
| 2005/0090947 A1 * | 4/2005 | Wise | 701/6 |
| 2005/0278085 A1 * | 12/2005 | Warkomski et al. | 701/6 |
| 2008/0133069 A1 * | 6/2008 | Morales De La Rica et al. | 701/4 |
| 2008/0147254 A1 * | 6/2008 | Vos et al. | 701/8 |
| 2009/0099811 A1 * | 4/2009 | Spoerry et al. | 702/151 |

* cited by examiner

METHOD OF ESTIMATING AN ANGLE OF ATTACK AND AN ANGLE OF SIDESLIP OF AN AIRCRAFT This application claims benefit of Serial No. TO2008A000923, filed 11 Dec. 2008 in Italy and which application is incorporated herein by reference. To the extent appropriate, a claim of priority is made to the above disclosed application.

BACKGROUND

The present invention relates to a method of estimating the angle of attack and the angle of sideslip of an aircraft.

More specifically, the invention relates to a method of estimating the angle of incidence or attack and the angle of sideslip of an aircraft.

The angle of incidence or attack and the angle of sideslip are two quantities which define parameters of the motion of an aircraft which must be monitored and controlled constantly to ensure the safety of the aircraft.

FIG. 1 shows a section through an aircraft 2 which is travelling along a direction of movement represented by a first vector 4. A second vector 6 represents the direction of an airflow which strikes the aircraft 2 longitudinally and $\alpha$ is the angle of incidence or attack formed by the intersection of the first vector 4 and the second vector 6.

FIG. 2 is a view of the aircraft 2 from above; the aircraft 2 is travelling along the direction of movement represented by the first vector 4. A third vector 8 represents the direction of an airflow which strikes the aircraft 2 laterally and $\beta$ is the angle of sideslip formed by the intersection of said first vector 4 and third vector 8.

The angle of attack $\alpha$ and the angle of sideslip $\beta$ should always have values below respective maximum values, for example, of 10° for the angle of attack and 5° for the angle of sideslip for a civilian transport aircraft since, if these values are exceeded, they lead to instability of the aircraft 2 which is a practically irretrievable condition.

The values of the angle of attack $\alpha$ and the angle of sideslip $\beta$ are conventionally calculated by known techniques on the basis of measurements of air pressure outside the aircraft 2. These pressure measurements are taken by sensors arranged on the external surface of the aircraft 2. Conventional pressure sensors are commonly known as "Pitot tubes".

Alternatively, the values of the angle of attack $\alpha$ and the angle of sideslip $\beta$ are measured by movable "fins" which are arranged on the external surface of the aircraft 2 and are oriented in the direction in which the wind is blowing.

In sensors based on "Pitot tubes" any overheating or obstruction of the sensor is detected by control signals; in "fin"-type sensors, however, it is much more difficult to detect failure since, for example, if a "fin" is deformed or inclined there are no measurement or feedback systems that can detect the deformation or displacement.

To overcome the problems described above, more pressure sensors are put in place than are strictly necessary to take the measurements, that is, typically about 4 to 5 units, because a certain degree of redundancy is necessary so as to perform an averaging operation on the pressure measurements detected by the individual sensors and/or to compensate for any failure of a sensor. This leads to an increase in the overall costs of the aircraft 2.

Moreover, because of the large number of sensors and the fact that they are arranged projecting from the surface of the aircraft 2, they are easily visible by detection radar and are not therefore suitable for use on military aircrafts.

SUMMARY OF THE INVENTION

The object of the present invention is therefore to propose a method of estimating the angle of attack and the angle of sideslip which does not require the use of pressure measurements and, therefore, of pressure sensors arranged on the external surface of the aircraft.

BRIEF DESCRIPTION OF THE DRAWINGS

Further characteristics and advantages of the invention will become clear from the following detailed description which is given purely by way of non-limiting example, with reference to the appended drawings, in which.

DETAILED DESCRIPTION OF THE PREFERRED EMBODIMENTS

Briefly, the method consists of calculating a model of the aircraft 2 supplied with measured flight commands, the model being used to perform an open-loop estimate of the state of the system.

However, the performance of an open-loop state estimator or observer is not adequate to obtain reliable data because of disturbances, parametric uncertainties, and non-modeled variables such as wind-speed.

The open-loop estimator is therefore corrected by inserting a control loop, in particular a numeric control filter which ensures the convergence of the variables of the model with real values measured by sensors of the aircraft 2, rejecting external disturbances.

The convergence of the values of the model variables with values measured on board the aircraft 2 is ensured since the control filter is designed so as to render the system globally stable.

The equations of the open-loop state observer are therefore corrected, by means of the control loop, by a quantity which is inversely proportional to the error given by the difference between the values of the model variables and the values measured on board the aircraft 2.

It has been found that, if the set of real measurements available is sufficiently representative, even quantities for which there is no direct measurement converge with the true values. In particular, the measurement of the angular velocities of an aircraft is sufficient to reconstruct the angles of attack and sideslip which have not been measured by conventional sensors.

Figure 3:
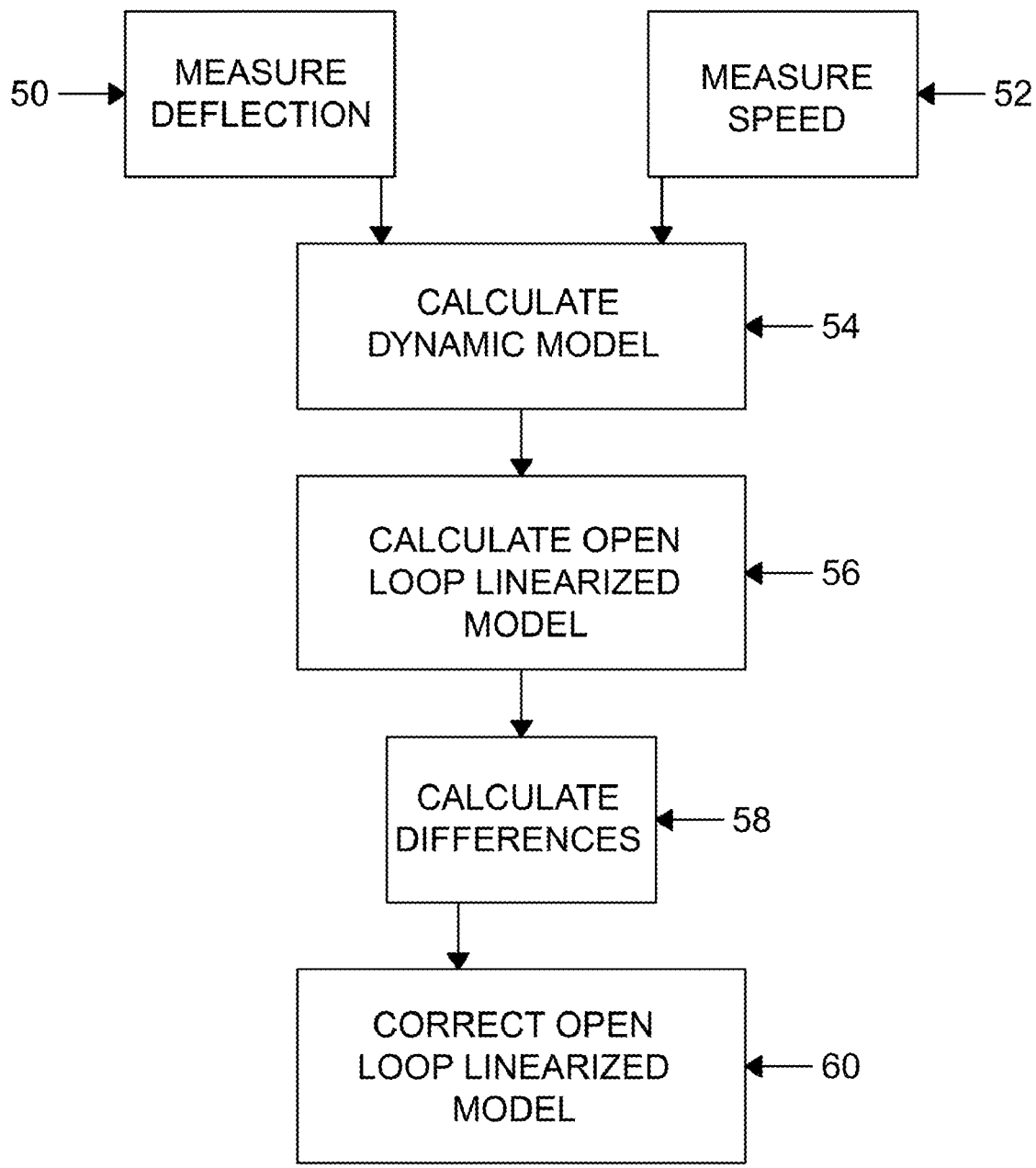
FIG. 3 is a flow chart of the steps of the method according to the invention.

FIG. 3 is a flow-chart of the steps of the method according to the invention.

Figure 1:
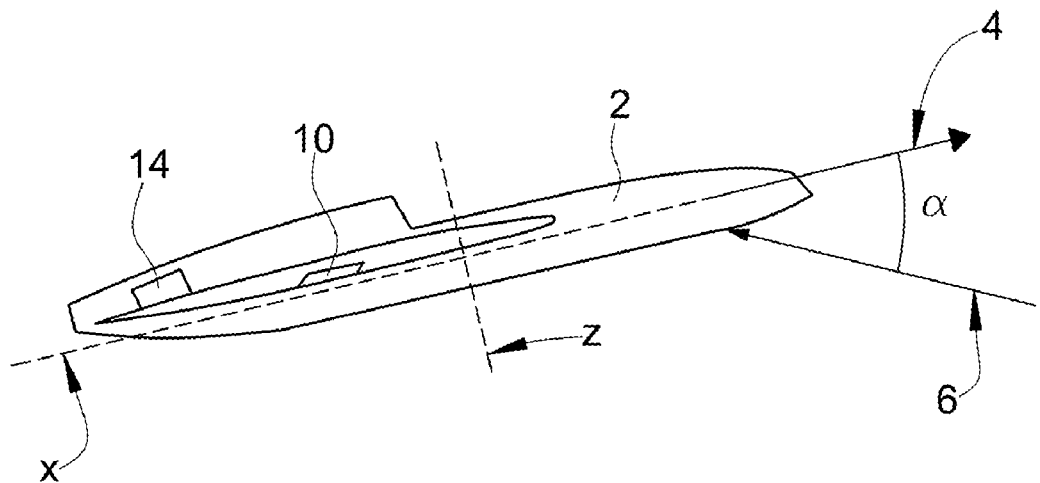
FIG. 1, which has already been described, is a sectional in view of an aircraft and the angle of attack $\alpha$, FIG. 2, which has already been described, is a sectional in view of an aircraft and the angle of sideslip $\beta$.
Figure 2:
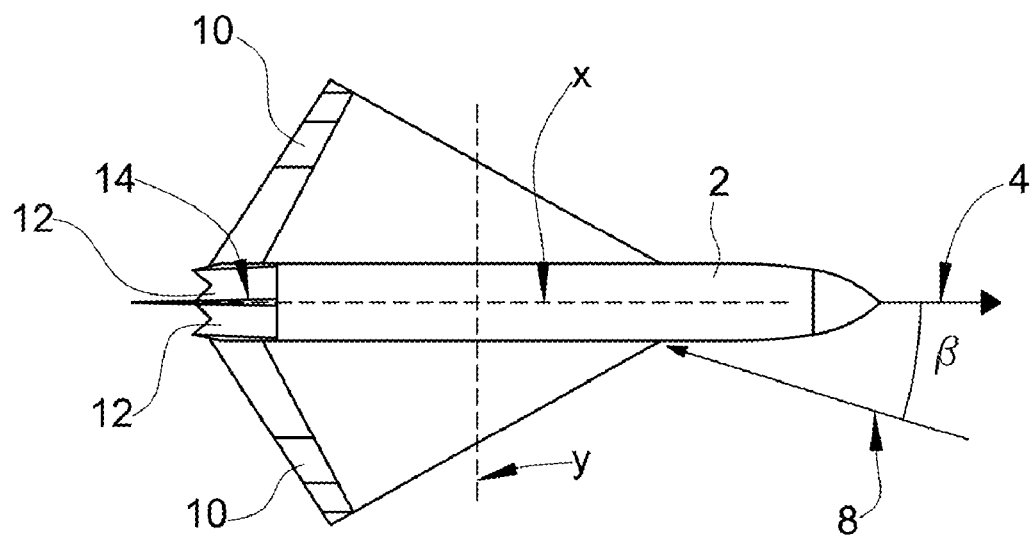

The aircraft 2 comprises a plurality of control surfaces such as, for example, ailerons 10 disposed on the wings of the aircraft 2 (see FIGS. 1 and 2), elevators 12 disposed on the tail, and the rudder 14. In rest conditions, these surfaces are aligned with respective reference surfaces, in particular, the aileron with the wing, the elevators with the horizontal tail plane, and the rudder with the vertical tail plane. The angles formed by each control surface with respect to the associated reference surface are referred to below by the generic term "deflections".

In step 50 quantities indicative of the deflection of each control surface, that is, the deflection $d_1$ of the ailerons, the deflection $d_2$ of the elevators and the deflection $d_3$ of the rudder, are measured. The deflection of the flaps disposed on the wings is also advantageously measured. The deflections are measured, for example, by sensors placed in the proximity of each control surface and which send signals representative of the values of those angles.

In step 52 the inertial velocities, that is, the effective rolling speed $p_E$, the effective pitching speed $q_E$, and the effective yawing speed $r_E$ are measured, in known manner. These speeds represent the rotation of the aircraft 2 about its own principal axes x, y and z (see FIGS. 1 and 2).

In step 54, a dynamic model of the aircraft 2 in motion in space (a model with six degrees of freedom) is created, in known manner, on the basis of test data (wind tunnel) and by deriving other known values by means of estimates on the basis of known criteria.

In step 56 a linearized model is derived from said dynamic model in known manner and is used as an open-loop estimator.

The open-loop linearized model of the state observer comprises the following equations:

$$\begin{cases} \dot{x} = Ax + Bu \\ y = Cx + Du \end{cases} \quad (1)$$

wherein A, B, D and D are matrices representative of the behavior of the aircraft 2 in unperturbed motion and vary in dependence on the altitude and speed of the aircraft 2. Said matrices A, B, C and D are obtained experimentally (wind tunnel) or on the basis of calculations based on the dynamic model.

For a short-period, simplified linearized model, u is a vector containing the deflection values of each control surface, x is a vector containing the estimated state variables of the system (1), in particular the estimated angle of attack $\alpha_s$, the estimated angle of sideslip $\beta_s$, the estimated rolling speed $p_s$, the estimated pitching speed $q_s$ and the estimated yawing speed $r_s$, $\delta y$ is an error vector containing the errors between the measured speeds and the respective estimated speeds calculated as described below and y is a measure vector containing the measured speed values.

The matrix A links the vector x with its differential and represents the free development of the dynamics of the aircraft over time.

An example of the matrix A for a tourism aircraft which is at an altitude of 2000 m and is travelling at a speed of 350 km/h is given in the following equation:

$$\begin{pmatrix} \dot{\alpha}_s \\ \dot{\beta}_s \\ \dot{p}_s \\ \dot{q}_s \\ \dot{r}_s \end{pmatrix} = \begin{pmatrix} -2.629 & 0 & 0 & 0.95414 & 0 \\ 0 & 0.4154 & 0.03543 & 0 & -0.999 \\ 0 & -1.578 & -6.497 & 0 & 2.258 \\ -8.106 & 0 & 0 & -2.23 & 0 \\ 0 & 6.548 & -0.4943 & -0.8744 & 0 \end{pmatrix} \begin{pmatrix} \alpha_s \\ \beta_s \\ p_s \\ q_s \\ r_s \end{pmatrix} \quad (2)$$

having considered the following vector x:

$$x = \begin{pmatrix} \alpha_s \\ \beta_s \\ p_s \\ q_s \\ r_s \end{pmatrix} \quad (3)$$

The matrix B represents the effect of the deflections of the control surfaces on the state of the aircraft 2.

An example of the matrix B for a tourism aircraft which is at an altitude of 2000 m and is travelling at a speed of 350 km/h is given in the following equation:

$$\begin{pmatrix} \dot{\alpha}_s \\ \dot{\beta}_s \\ \dot{p}_s \\ \dot{q}_s \\ \dot{r}_s \end{pmatrix} = \begin{pmatrix} 0 & -0.1176 & 0 \\ 0.05399 & 0 & 0.0986 \\ 36.47 & 0 & 0.196 \\ 0 & -10.18 & 0 \\ 0.7896 & 0 & 0.7896 \end{pmatrix} \begin{pmatrix} d_1 \\ d_2 \\ d_3 \end{pmatrix} \quad (4)$$

The matrix C makes a distinction between the variables for which a physical measurement is available and those which are effectively estimated by the observer. In particular, it is a matrix having zeros arranged in a manner such as to cancel out the contribution of the estimated angle of attack $\alpha_s$ and of the estimated angle of sideslip $\beta_s$ contained in the vector x by which the matrix C is multiplied.

An example of the matrix C for a tourism aircraft which is at an altitude of 2000 m and which is travelling at a speed of 350 km/h is given in the following equation:

$$\begin{pmatrix} p_M \\ q_M \\ r_M \end{pmatrix} = \begin{pmatrix} 1 & 0 & 0 & 0 & 0 \\ 0 & 1 & 0 & 0 & 0 \\ 0 & 0 & 1 & 0 & 0 \end{pmatrix} \begin{pmatrix} \alpha_s \\ \beta_s \\ p_s \\ q_s \\ r_s \end{pmatrix} \quad (5)$$

The matrix D is always zero.

In step 58 the differences between the estimated speeds and the corresponding measured speeds are performed in order to calculate the error vector $\delta y$ in which, for example, the first component is given by the difference between the effective rolling speed $p_E$ and the estimated rolling speed $p_s$, the second component is given by the difference between the effective pitching speed $q_E$ and the estimated pitching speed $q_s$, the third component is given by the difference between the effective yawing speed $r_E$ and the estimated yawing speed $r_s$.

In step 60 the open-loop linearized model is corrected with the use of the error vector $\delta y$ on the basis of the following equations:

$$\begin{cases} \dot{x} = Ax + Bu + L\delta y \\ y = Cx + Du \end{cases} \quad (6)$$

wherein the matrix L is a feedback matrix containing the gains of the control filter described below.

Figure 4:
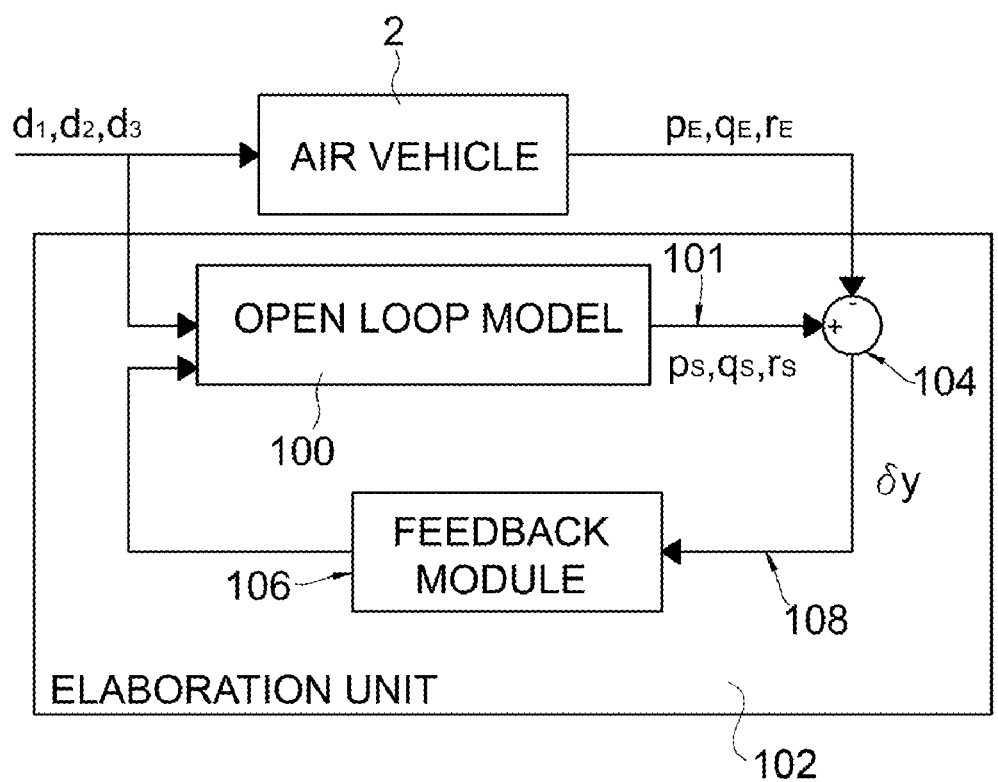
FIG. 4 is a block diagram of a system arranged to carry out the method according to the invention.

FIG. 4 is a block diagram of a system suitable for implementing the method according to the invention.

The system comprises the aircraft 2 which is controlled by means of the deflections d1, d2 and d3 of the respective control surfaces whose effective rolling speed $p_E$, effective pitching speed $q_E$, and effective yawing speed $r_E$ are measured.

The signals representative of the values of the deflections d1, d2 and d3 are sent to an open-loop module 100 of a control unit 102, said open-loop module 100 being arranged to calculate the open-loop linearized model of the system and to output, on a direct branch 101, the values of the estimated rolling speed $p_s$, the estimated pitching speed $q_s$, and the estimated yawing speed $r_s$.

The control unit 102 further comprises a subtraction module 104 arranged to calculate the difference between the effective speeds and the respective estimated speeds so as to produce the error vector δy.

Finally, the control unit 102 comprises a feedback module 106 arranged in a feedback branch 108 of the system suitable for forming a closed loop, the feedback module 106 being arranged to form in known manner a numeric control filter. In particular, a filter is formed with the use of Kalman optimization techniques on a Luenberger filter structure.

The gain values of the filter are contained in the feedback matrix L. In particular, each row of the matrix represents the correction of a state variable of the system (6) representative of the corrected linearized model. The correction coefficients, in particular, three correction coefficients, one for each angular velocity, are in the columns.

The gain values are sent to the open-loop module 100 which is arranged to modify the open-loop linearized model of the system by inserting said control filter so as to obtain a convergence between the estimated speeds and the respective effective speeds of the aircraft 2.

When the convergence of the speeds is achieved, the estimated angle of attack $\alpha_s$ and the estimated angle of sideslip $\beta_s$ also converge with the effective angle of attack $\alpha_E$ and the effective angle of sideslip $\beta_E$, respectively.

The effective angle values can thus be obtained without the need to measure them by means of sensors.

Clearly, the principle of the invention remaining the same, the embodiments and details of construction may be varied widely with respect to those described and illustrated purely by way of non-limiting example, without thereby departing from the scope of protection of the present invention defined by the appended claims.

What is claimed is:

1. A method for estimating an angle of attack and an angle of sideslip of an aircraft having a plurality of control surfaces, each control surface being adjustable with respect to an associated reference surface, the method comprising the steps of:
    measuring quantities representative of an angle formed by each control surface with respect to the associated reference surface;
    measuring an effective rolling speed, effective pitching speed and effective yawing speed of the aircraft;
    defining a linearized model of a state observer according to the following equation system:

$$\begin{cases} \dot{x} = Ax + Bu + L\delta y \\ y = Cx + Du \end{cases}$$

wherein u is a vector containing the values of said quantities of each control surface, x is a vector comprising an estimated angle of attack, an estimated angle of sideslip, an estimated rolling speed, an estimated pitching speed and an estimated yawing speed, δy is an error vector comprising errors between the measured speeds and the respective estimated speeds, y is a measure vector comprising values of the measured speeds, A, B, C, D are matrices representative of a behavior of the aircraft in unperturbed motion and L is a feedback matrix comprising gains of a predetermined numeric control filter; and
    obtaining from the model the estimated angle of attack and the estimated angle of sideslip to use respectively as an actual angle of attack and an actual angle of sideslip of the aircraft.

2. The method according to claim 1, wherein said numeric control filter is carried out by means of Kalman optimization techniques on a structure of Luenberger filter.

3. The method according to claim 1, wherein the control surfaces comprise ailerons placed on wings of the aircraft, elevators placed on a tail of the aircraft, and a rudder.

4. The method according to claim 1, wherein the error vector comprises a first component equal to the difference between the effective rolling speed and the estimated rolling speed, a second component equal to the difference between the effective pitching speed and the estimated pitching speed, and a third component equal to the difference between the effective yawing speed and the estimated yawing speed.

5. A system for estimating an angle of attack and an angle of sideslip of an aircraft having a plurality of control surfaces, each control surface being adjustable with respect to an associated reference surface, the system comprising:
    means for measuring quantities representative of an angle formed by each control surface with respect to the associated reference surface;
    means for measuring an effective rolling speed, effective pitching speed and effective yawing speed of the aircraft;
    a control unit arranged to define a linearized model of a state observer according to the following equation system:

$$\begin{cases} \dot{x} = Ax + Bu + L\delta y \\ y = Cx + Du \end{cases}$$

wherein u is a vector containing the values of said quantities of each control surface, x is a vector comprising an estimated angle of attack, an estimated angle of sideslip, an estimated rolling speed, an estimated pitching speed and an estimated yawing speed, δy is an error vector comprising errors between the measured speeds and the respective estimated speeds, y is a measure vector comprising values of the measured speeds, A, B, C, D are matrices representative of a behavior of the aircraft in unperturbed motion and L is a feedback matrix comprising gains of a predetermined numeric control filter; said control unit being further arranged to gather from the linearized model the values of the estimated angle of attack and the estimated angle sideslip to use respectively as an actual angle of attack and an actual angle of sideslip of the aircraft.

6. The system according to claim 5, wherein said control unit comprises:

an open loop module arranged to receive said quantities and to output in a direct branch the estimated rolling speed, the estimated pitching speed and the estimated yawing speed;

a subtraction module arranged to provide the error vector; and a feedback module, placed in a feedback branch and arranged to create a closed loop, said feedback module being arranged to carry out said numeric control filter.

* * * * *